United States Patent
Balakavi et al.

(10) Patent No.: US 9,621,464 B2
(45) Date of Patent: Apr. 11, 2017

(54) MULTICAST SPRAY OVER LAG

(71) Applicant: Brocade Communications Systems, Inc., San Jose, CA (US)

(72) Inventors: Venkata Pramod Balakavi, Dublin, CA (US); Vipin Agrawal, Milpitas, CA (US); Kung-Ling Ko, Union City, CA (US); John Terry, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 687 days.

(21) Appl. No.: 13/789,906

(22) Filed: Mar. 8, 2013

(65) Prior Publication Data

US 2014/0153570 A1  Jun. 5, 2014

Related U.S. Application Data

(60) Provisional application No. 61/732,903, filed on Dec. 3, 2012.

(51) Int. Cl.
*H04L 12/743* (2013.01)
*H04L 12/709* (2013.01)

(52) U.S. Cl.
CPC ........ *H04L 45/7453* (2013.01); *H04L 45/245* (2013.01); *Y02B 60/33* (2013.01)

(58) Field of Classification Search
None
See application file for complete search history.

(56) References Cited

U.S. PATENT DOCUMENTS

2012/0033668 A1* 2/2012 Humphries ................... 370/390

* cited by examiner

*Primary Examiner* — Hassan Phillips
*Assistant Examiner* — Omeed D Rahgozar
(74) *Attorney, Agent, or Firm* — Blank Rome, LLP

(57) ABSTRACT

Use of a hash operation based on selected information in the packet to select one of a set of enable vectors. The selected enable vector is then effectively ANDed with the link expansion vector to select the actual links to be used. The enable vectors vary by selecting a different link in the LAG port for each enable vector. Thus the hash is used to vary the link of the LAG port used to transmit the packet for that multicast packet.

20 Claims, 5 Drawing Sheets

MULTICAST SPRAY OVER LAG

RELATED APPLICATIONS

This application is a non-provisional application of Ser. No. 61/732,903, titled "Multicast Spray Over LAG," filed Dec. 3, 2012, which is incorporated herein by reference.

TECHNICAL FIELD

The invention relates to network devices, and more particularly to multicasting of packets.

BACKGROUND

Link Aggregation Protocol (LAG) is a mechanism used to combine multiple links and treat them as single link for layer 2 purposes. This is covered by IEEE 802.3ad and IEEE 802.1AX-2008.

A multicast packet is a multi-destination packet, as opposed to unicast packets which are intended for a single destination.

Referring to FIG. 1, a lookup engine 102 generates a Multicast Group ID (MGID) from the control information of an incoming multicast packet. This Multicast Group ID maps to a link bitmap 104 in a link expansion vector table 106, the link bitmap 104 indicating links the packet should be transmitted on to reach its destination. Based on the link bitmap 104, a copy of the packet is sent to the corresponding links.

Referring to FIG. 2, for a LAG port 202, packets are sent over only one "preselected" link in that LAG port 202. In order to avoid duplicate packets and packet out-of-order problems, packets cannot be sent over all three links in the exemplary LAG port 202. Utilizing only a single link, however, is inefficient usage of the LAG bandwidth, which is the primary reason for using a LAG in the first place.

SUMMARY OF THE INVENTION

Embodiments according to the present invention use a hash operation based on selected information in the packet to select one of a set of enable vectors. The selected enable vector is then effectively ANDed with the link expansion vector to select the actual links to be used. The enable vectors vary by selecting a different link in the LAG port for each enable vector. Thus, the hash operation is used to change the link of the LAG port that is utilized to transmit a multicast packet.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Embodiments according to the present invention provide more efficient LAG port bandwidth usage by spraying multicast packets over the LAG port through hashing the flow information of the packets. This technique creates a single copy of the packet on the LAG port. Thus, packets belonging to the same flow are always sent on the same link in the LAG port to avoid out of order problems.

Figure 1:
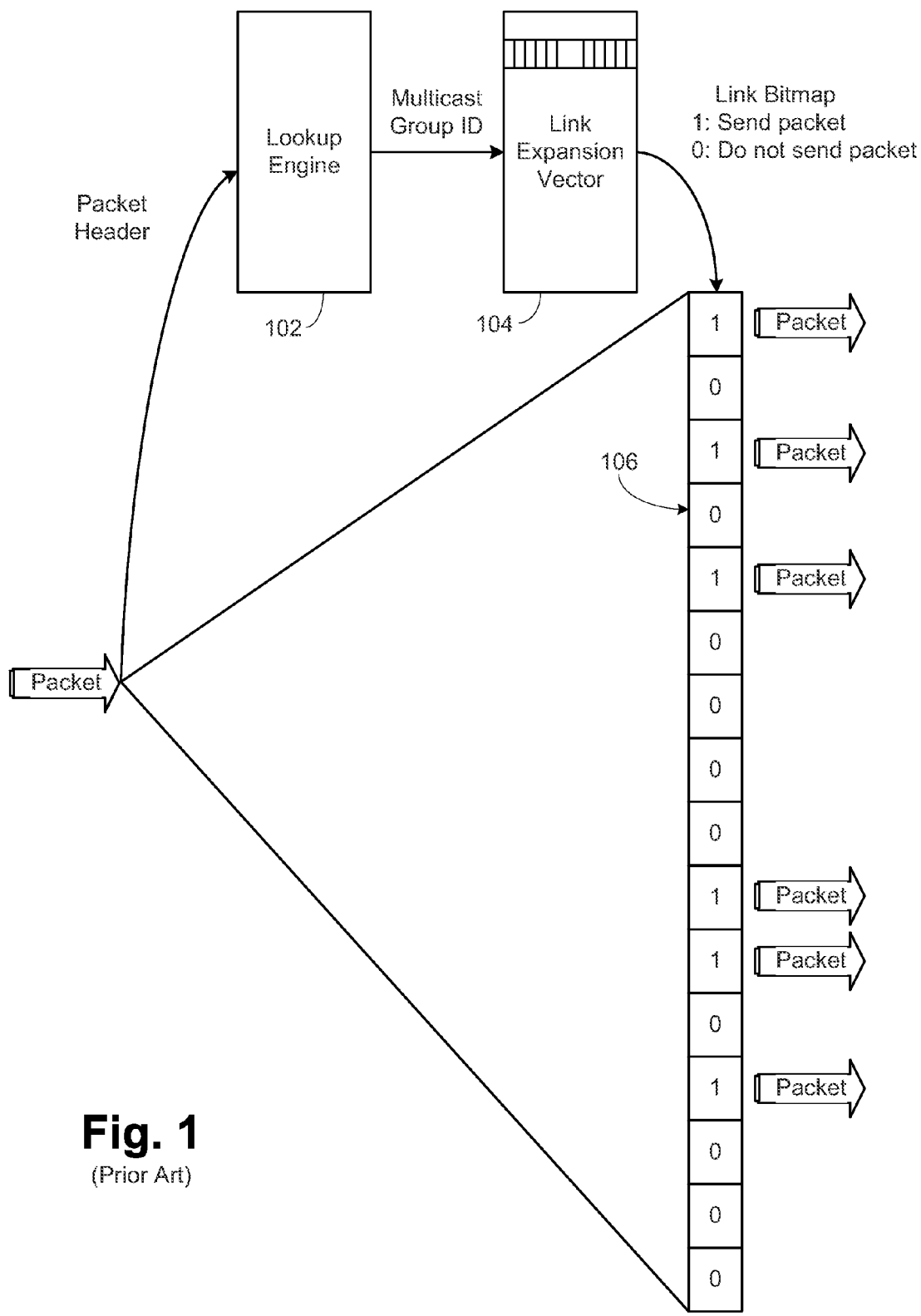
FIG. 1 is a diagram illustrating multicast packet expansion according to the prior art.
Figure 2:
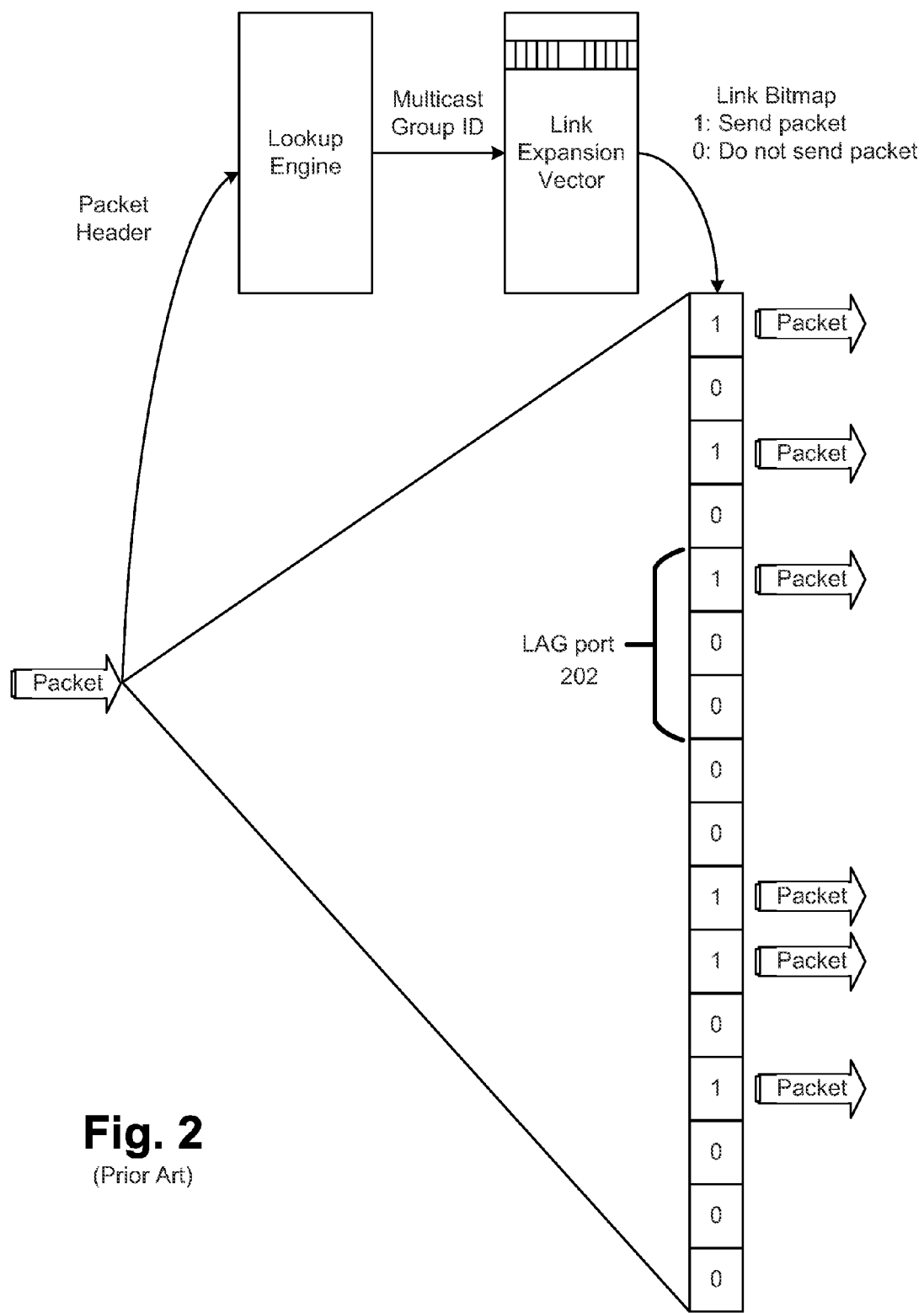
FIG. 2 is a diagram illustrating multicast packet expansion when a LAG port is included according to the prior art.
Figure 3:
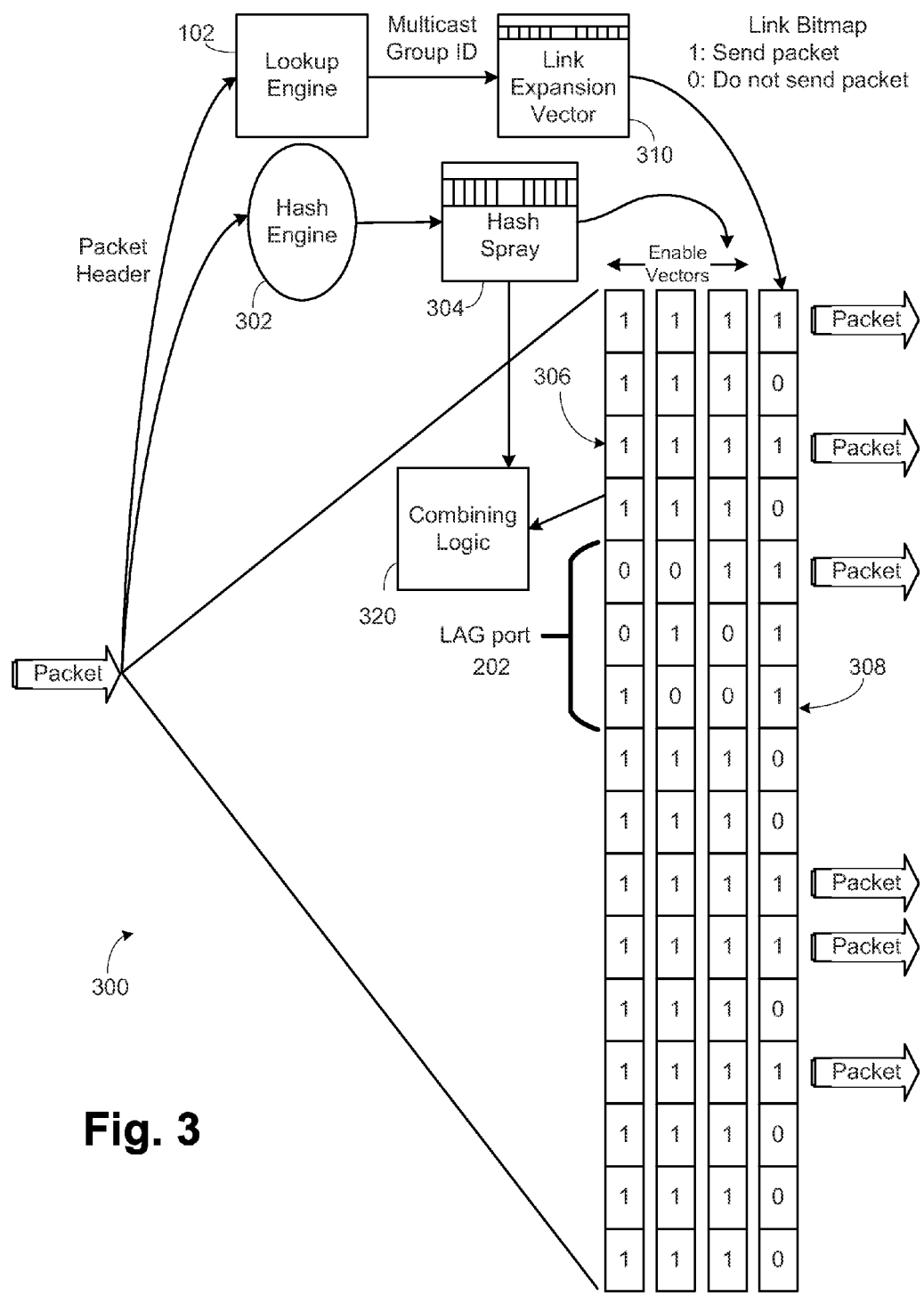
FIG. 3 is a diagram illustrating multicast spraying logic which uses a hash in combination with the multicast expansion in accordance with one embodiment of the present invention.

Referring to FIG. 3, an exemplary embodiment of a multicast spraying logic 300 is shown. A lookup engine 102 generates a Multicast Group ID from control information of the incoming multicast packet. This Multicast Group ID maps to a link bitmap 308 in a link expansion vector table 310. At the same time, control information from the incoming multicast packet, such as MAC source and destination addresses, IP source and destination addresses and TCP source and destination ports, is used by a hash engine 302 to create a hash value which indexes into a hash spray table 304. The output of the hash spray table 304 is an enable vector 306 which qualifies the link bitmap 308. There are at least as many enable vectors as there are links in the LAG port, though higher multiples, such as two enable vectors per link, can be used to allow use of a finer grained hash value which may result in better spray resolution.

In contrast to the prior art link bitmap 104 where only one of the links of the LAG port was enabled, in the link bitmap 308 bits for all of the corresponding links belonging to a LAG port are enabled. Each enable vector 306 has exactly the same number of bits as the link bitmap 308, but the bits are constructed differently. For non-LAG port links, the corresponding bit in the enable vector 308 should be a one (1) or enabled. For LAG port links, only one link should be enabled per enable vector entry in the hash spray table 304.

To create a copy of the packet on a link, corresponding bits in the link bitmap 308 and the enable vector 306 must be one (1), thus performing a logical AND operation. To achieve this, a combining logic 320 is used. The combining logic performs a logical AND between the link bitmap 308 and the enable vector 306.

Figure 4:
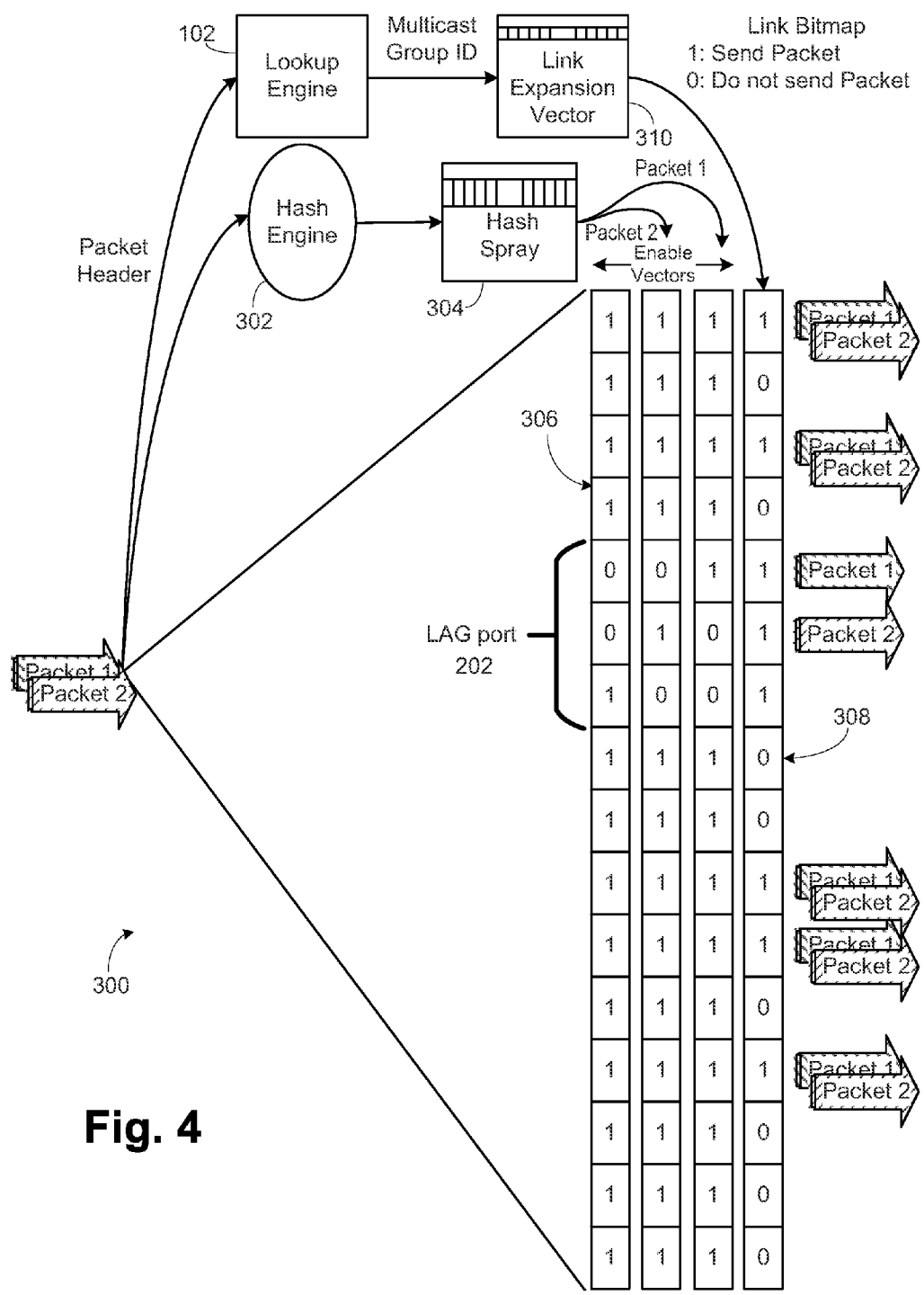
FIG. 4 is an example of two multicast packets in the diagram of FIG. 3.

FIG. 4 illustrates the operation by showing distribution of two packets having the same Multicast Group ID but having different hash values. As illustrated, packet 1 and packet 2 use different links in the LAG port.

While the enable vectors have been shown as including bits for all links, in an alternate embodiment of the present invention, the enable vectors only contain bits relating to the links in the LAG port and only those bits are combined with the link bitmap.

Figure 5:
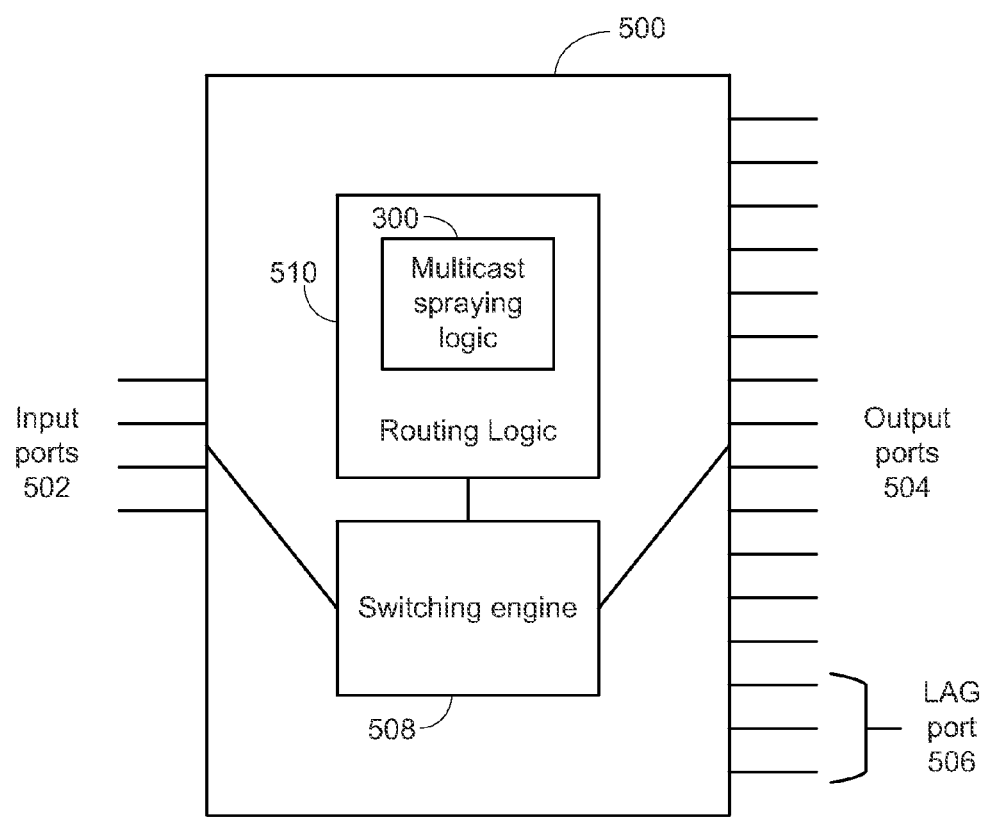
FIG. 5 is a block diagram of a network device including the multicast spraying logic of FIG. 3.

FIG. 5 is an exemplary network device 500, such as a switch, which includes the multicast spraying logic 300. A series of input ports 502 receive packets, including multicast packets. A series of output ports 504 provide packets received at the input ports 502. Some of the series of output ports 504 are combined to form a LAG port 506. A switching engine 508 couples the input ports 502 and the output ports 504. Routing logic 510 is connected to the switching engine 508 to determine the routing of incoming packets. The routing logic 510 includes the multicast spraying logic 300, along with other normal routing logic.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network device comprising:
   an input port for receiving multicast packets;
   a plurality of output ports, a first number of said plurality of output ports configured to form a link aggregation protocol (LAG) port;
   multicast spraying logic coupled to said input port and said plurality of output ports including said LAG port, said multicast spraying logic including:
      a lookup engine coupled to said input port which examines the received multicast packet and develops a multicast group ID of the multicast packet;
      a link expansion vector table coupled to said lookup engine and including a plurality of link bitmaps, the link bitmap indicating which of the plurality of output ports the packet is to be provided to, said link expansion table selecting one of the plurality of link bitmaps for each received multicast packet according to the received multicast group ID value;
      a hash engine coupled to said input port which examines the received multicast packet and develops a hash from the received multicast packet;
      a hash spray table coupled to said hash engine and containing a plurality of enable vectors, the enable vectors enabling a variety of output ports in the LAG port, said hash spray table selecting an enable vector according to the applied hash value; and
      combining logic coupled to said link expansion vector table and said hash spray table to form a logical AND of said selected link bitmap and selected enable vector for at least the output ports of the LAG port, the output of said combining logic indicating which of the output ports of the LAG port is to be used for that packet.

2. The network device of claim 1, wherein the number of hash values is a multiple of the number of output ports in the LAG port.

3. The network device of claim 1, wherein said hash spray table includes an enable vector for each hash value.

4. The network device of claim 3, wherein at least two of the enable vectors enable the same output port in the LAG port.

5. The network device of claim 1, wherein the enable vectors form a set to evenly spray packets over the output ports of the LAG port.

6. The network device of claim 1, wherein said multicast spraying logic is configured to expand the received multicast packet to a plurality of packets provided over selected of said plurality of output ports including said LAG port.

7. The network device of claim 1, wherein the hash has at least the number of values as the number of output ports in the LAG port.

8. The network device of claim 1, wherein the link expansion vector table includes one link bitmap each multicast group ID.

9. The network device of claim 1, wherein if the LAG port is to be included in the selected output ports the packet should be provided to, the link bitmap indicates that the packet is to be provided to all of the output ports in the LAG port.

10. A method comprising:
    receiving a multicast packet;
    developing a link bitmap indicating which of a series of output ports the multicast packet should be provided to, said link bitmap indicating each of the output ports in a link aggregation protocol (LAG) port;
    developing a hash value for the multicast packet;
    utilizing said hash value to select one of a set of enable vectors, the set of enable vectors evenly spraying packets over the output ports of the LAG port; and
    combining said link bitmap and said selected enable vector to indicate which of the output ports of the LAG port to use for the packet.

11. The method of claim 10, wherein the number of hash values is a multiple of the number of output ports in the LAG port.

12. The method of claim 10, wherein there is one enable vector for each hash value.

13. The method of claim 12, wherein at least two of the enable vectors enable the same output port in the LAG port.

14. The method of claim 10, wherein the hash has at least the number of values as the number of output ports in the LAG port.

15. The method of claim 10, further comprising examining the received multicast packet and developing a multicast group ID for the multicast packet.

16. The method of claim 10, wherein one link bitmap is developed for each multicast group ID.

17. The method of claim 10, wherein combining said link bitmap and said selected enable vector comprises forming a logical AND of said link bitmap and said enable vector for at least the output ports of the LAG port.

18. The method of claim 17, wherein the output of said logical AND indicates which of the output ports of the LAG port is to be used for that packet.

19. The method of claim 10, further comprising expanding a received multicast packet to a plurality of packets.

20. The method of claim 10, wherein the plurality of packets are provided to selected of said output ports including said LAG port.

* * * * *